(12) United States Patent
Naik et al.

(10) Patent No.: US 11,946,689 B2
(45) Date of Patent: Apr. 2, 2024

(54) THERMAL BRIDGEBREAKER AND SEAL FEATURES IN A THIN-WALLED VACUUM INSULATED STRUCTURE

(71) Applicant: WHIRLPOOL CORPORATION, Benton Harbor, MI (US)

(72) Inventors: Abhay Naik, Stevensville, MI (US); Lorraine J. Westlake, Eau Claire, MI (US); Lakshya J. Deka, Mishawaka, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 440 days.

(21) Appl. No.: 17/135,186

(22) Filed: Dec. 28, 2020

(65) Prior Publication Data

US 2021/0116168 A1   Apr. 22, 2021

Related U.S. Application Data

(63) Continuation of application No. 16/312,641, filed as application No. PCT/US2016/043991 on Jul. 26, 2016, now Pat. No. 10,914,511.

(51) Int. Cl.
| | |
|---|---|
| *F25D 23/08* | (2006.01) |
| *B29C 65/48* | (2006.01) |
| *F25D 23/06* | (2006.01) |

(52) U.S. Cl.
CPC ......... *F25D 23/085* (2013.01); *F25D 23/064* (2013.01); *B29C 65/48* (2013.01);
(Continued)

(58) Field of Classification Search
CPC ... B29C 65/48; B29C 65/483; B29C 65/4835; B29C 65/542; B29C 65/56; B29C 65/58; B29C 65/72; F25D 2201/12; F25D 2201/122; F25D 2201/14; F25D 23/064; F25D 23/085; F25D 2400/00; F25D 2500/02
(Continued)

(56) References Cited

U.S. PATENT DOCUMENTS

| 2,267,279 A | 12/1941 | Kuenzli |
|---|---|---|
| 2,809,764 A | 10/1957 | Diamond |

(Continued)

FOREIGN PATENT DOCUMENTS

| DE | 9204365 U1 | 7/1992 |
|---|---|---|
| EP | 2447639 A2 | 5/2012 |

(Continued)

*Primary Examiner* — Philip C Tucker
*Assistant Examiner* — Brian R Slawski
(74) *Attorney, Agent, or Firm* — Price Heneveld LLP

(57) ABSTRACT

A vacuum insulated refrigerator structure includes an outer wrapper having a first opening and a first edge extending around the first opening. A liner has a second opening and second edge extending around the second opening. The liner is disposed inside the wrapper with the first and second edges being spaced apart to form a gap therebetween. An insulating thermal bridge extends across the gap, and an airtight vacuum cavity is formed between the wrapper and the liner. The thermal bridge includes elongated first and second channels having sealant disposed therein, and the first and second edges are disposed in the first and second channels, respectively. Porous core material may be disposed in the vacuum cavity.

20 Claims, 12 Drawing Sheets

(52) U.S. Cl.
CPC .... *F25D 2201/12* (2013.01); *F25D 2201/122* (2013.01); *F25D 2201/14* (2013.01); *F25D 2400/00* (2013.01); *F25D 2500/02* (2013.01)

(58) Field of Classification Search
USPC ..... 156/60, 90, 91, 196, 212, 285, 286, 292, 156/293, 305; 220/592.06, 592.09, 592.1, 220/DIG. 3; 312/400, 406.2
See application file for complete search history.

(56) References Cited

U.S. PATENT DOCUMENTS

| | | |
|---|---|---|
| 3,165,221 A | 1/1965 | Kasady |
| 3,444,280 A | 5/1969 | Pulaski |
| 3,632,012 A | 1/1972 | Kitson |
| 3,633,783 A | 1/1972 | Aue |
| 6,485,122 B2 | 11/2002 | Wolf et al. |
| 2002/0041134 A1 | 4/2002 | Wolf et al. |
| 2010/0287974 A1 | 11/2010 | Cur et al. |
| 2013/0270732 A1 | 10/2013 | Wu et al. |
| 2016/0258671 A1 | 9/2016 | Allard et al. |
| 2018/0017314 A1 | 1/2018 | Jeong et al. |

FOREIGN PATENT DOCUMENTS

| | | |
|---|---|---|
| WO | 9920961 A1 | 4/1999 |
| WO | 2004010042 A1 | 1/2004 |

THERMAL BRIDGEBREAKER AND SEAL FEATURES IN A THIN-WALLED VACUUM INSULATED STRUCTURE

CROSS-REFERENCE TO RELATED APPLICATIONS

The present application is a continuation of U.S. patent application Ser. No. 16/312,641, filed Dec. 21, 2018, now U.S. Pat. No. 10,914,511, entitled "THERMAL BRIDGEBREAKER AND SEAL FEATURES IN A THIN-WALLED VACUUM INSULATED STRUCTURE," which is a National Stage Application under 35 U.S.C. § 371 of International Patent Application No. PCT/US2016/043991, filed Jul. 26, 2016, entitled "THERMAL BRIDGEBREAKER AND SEAL FEATURES IN A THIN-WALLED VACUUM INSULATED STRUCTURE," the entire disclosures of which are hereby incorporated herein by reference.

BACKGROUND

The present device generally relates to insulated structures, and in particular to a vacuum insulated refrigerator cabinet that includes a thermal bridge breaker and seal that interconnects a wrapper and a liner.

Various types of insulated refrigerator cabinet structures have been developed. One type of insulated structure includes a wrapper and a liner. The wrapper and liner are spaced apart to form an internal cavity, and the cavity is filled with polyurethane foam or other insulating material. Vacuum insulated refrigerator structures have also been developed. Vacuum insulated refrigerator structures may include a wrapper and a liner that define a cavity therebetween. The cavity may be filled with a vacuum insulated core material. Known refrigerator cabinet structures may suffer from various drawbacks, including transfer of heat from the wrapper to the liner.

SUMMARY

In at least one aspect, the present disclosure includes a method of making a vacuum insulated refrigerator structure. The method includes forming a wrapper from a sheet of material whereby the wrapper has a first opening and a first edge extending around the first opening. A liner is formed from a sheet of material. The liner has a second opening and a second edge extending around the second opening. The liner is positioned inside the wrapper with the first and second edges being spaced apart to form a gap therebetween. A cavity is formed between the wrapper and the liner. An insulating thermal bridge is positioned across the gap. The thermal bridge includes elongated first and second channels, and the first and second edges are inserted into the first and second channels, respectively. Curable sealant is positioned in the first and second channels. The curable sealant may extend around, and encapsulate, the first and second edges to seal the cavity. The first and/or second channels may include one or more protrusions or bosses on side surfaces of the channels to position the edges at a central portion of the channel and form gaps between the edges and the side surfaces of the channels. The gaps may be filled with curable sealant. The method includes causing porous material to at least partially fill the cavity between the wrapper and the liner. The porous material may comprise one or more core panels that are positioned between the wrapper and the liner prior to positioning of the insulated thermal bridge across the gap between the wrapper and the liner. Alternatively, the porous material may comprise powder or other suitable loose material that is introduced into the cavity after the thermal bridge is positioned across the gap. A vacuum is formed in the cavity, and the cavity is sealed to maintain the vacuum.

In at least another aspect, a vacuum insulated refrigerator structure includes an outer wrapper having a first opening and a first edge extending around the first opening. A liner has a second opening and second edge extending around the second opening. The liner is disposed inside the wrapper with the first and second edges being spaced apart to form a gap therebetween. A vacuum cavity is formed between the wrapper and the liner. An insulating thermal bridge extends across the gap. The thermal bridge includes elongated first and second channels, and the first and second edges are disposed in the first and second channels, respectively. Sealant is disposed in the first and second channels to seal the vacuum cavity and maintain a vacuum in the vacuum cavity. Porous material is disposed in the vacuum cavity. The porous material may comprise pre-formed core panels, or the porous material may comprise loose filler material such as powder.

These and other features, advantages, and objects of the present device will be further understood and appreciated by those skilled in the art upon studying the following specification, claims, and appended drawings.

DETAILED DESCRIPTION OF EMBODIMENTS

Figure 1:
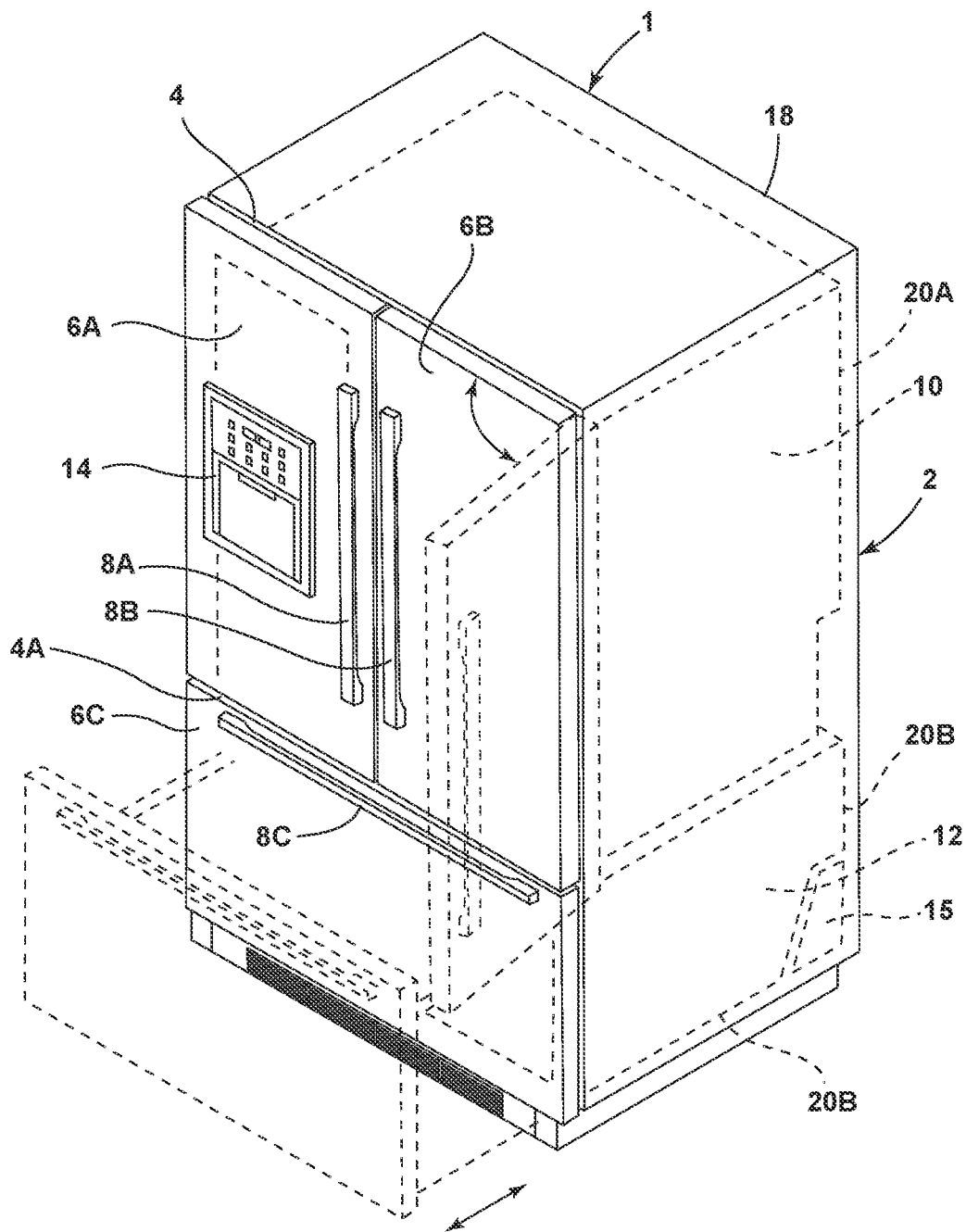
FIG. 1 is an isometric view of a refrigerator including a vacuum insulated cabinet structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

The present application is related to PCT Application No. PCT/US2016/043979, filed on Jul. 26, 2016, and entitled "CONSTRUCTING TRIM BREAKER FOR VACUUM INSULATED REFRIGERATOR USING INJECTION MOLDING AND EXTRUSION PROCESS," now International Patent Application Publication No. WO 2018/022006, and PCT Application No. PCT/US2016/043983, filed on Jul. 26, 2016, and entitled "VACUUM INSULATED STRUCTURE TRIM BREAKER," now International Patent Application Publication No. WO 2018/022007. The entire contents of these related applications are hereby incorporated by reference.

With reference to FIG. 1, a refrigerator 1 includes a vacuum insulated cabinet structure 2 having one or more openings 4 and 4A that may be closed off by doors 6A, 6B, and/or 6C. The doors 6A and 6B in the illustrated example are pivotably mounted to the cabinet structure 2 whereby the doors 6A and 6B pivot between open and closed positions. In use, a user grasps handles 8A and 8B to selectively open and/or close the doors 6A and 6B in a known manner to provide access to a refrigerated compartment 10 through upper opening 4. In the illustrated example, the door 6C comprises a sliding drawer having a handle 8C that provides access to a freezer compartment 12.

Door 6A may optionally include an ice and/or water dispenser 14. It will be understood that various sizes, shapes, and types of doors (pivoting, sliding, etc.) may be utilized in connection with vacuum insulated cabinet structure 2 as required for a particular application.

A refrigerator system 15 cools the compartments 10 and 12. The refrigeration system 15 may comprise a known system including a compressor, condenser, expansion valve, evaporator, conduits, and other related components (not shown). Alternatively, the refrigeration system 15 may comprise thermoelectric components (not shown), or other suitable arrangement.

Figure 2:
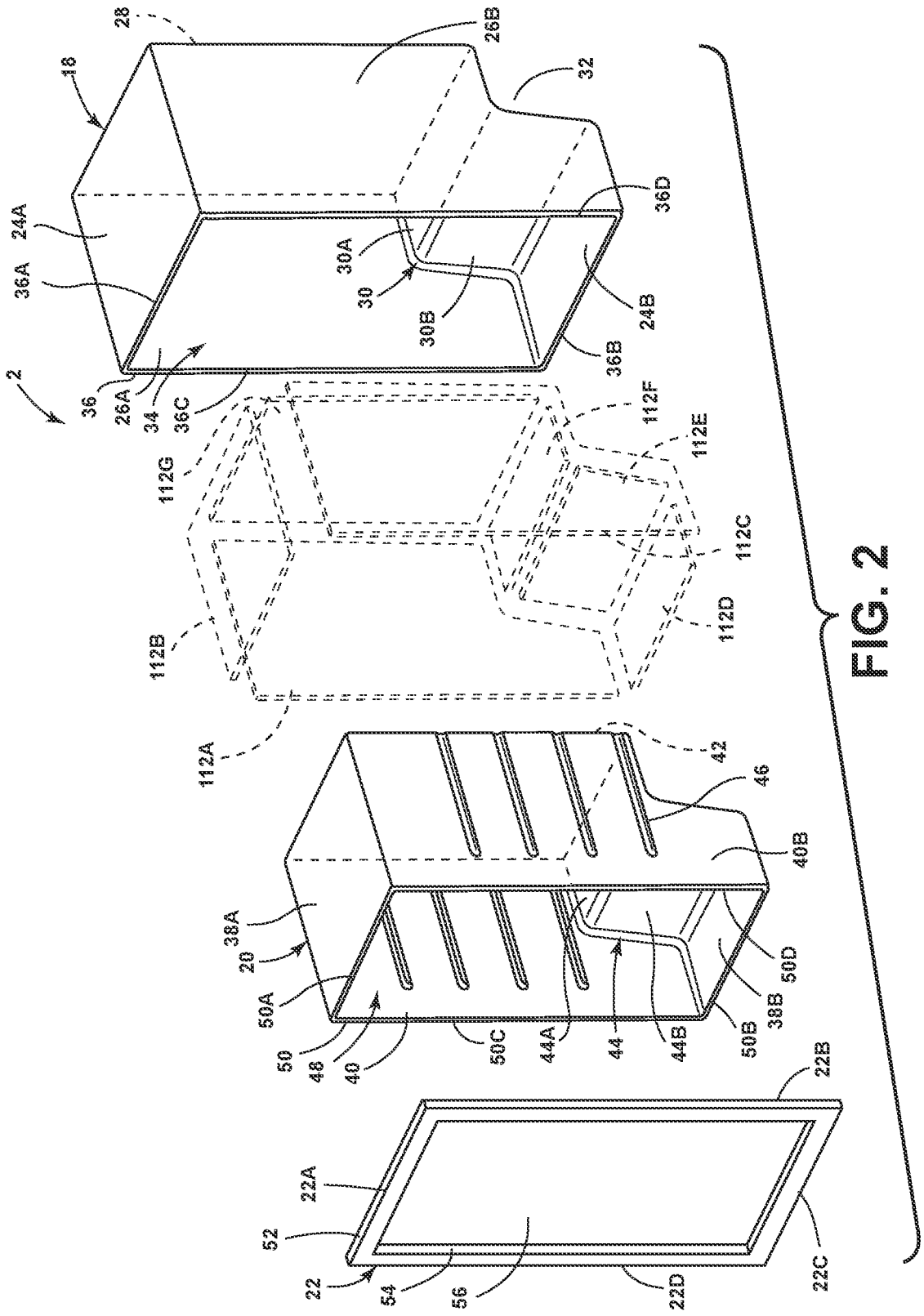
FIG. 2 is an exploded isometric view of a vacuum insulated refrigerator cabinet structure.

With further reference to FIG. 2, the vacuum insulated cabinet structure 2 includes a wrapper 18 and a liner 20 that is disposed inside wrapper 18 when assembled. As discussed below in connection with FIGS. 9-14, cabinet 2 may optionally include a horizontal partition and upper and lower liners 20A and 20B to form upper and lower compartments 10 and 12, respectively. As discussed in more detail below, the vacuum insulated cabinet structure 2 also includes a thermal bridge 22 that interconnects wrapper 18 and liner 20 when assembled. As also discussed below, wrapper 18, liner 20, and thermal bridge 22 form a vacuum cavity 110 (FIG. 6) that is filled with a vacuum core material 112. Vacuum core material 112 may comprise a plurality of preformed individual core panels 112A-112G (FIG. 2) that are preformed and positioned between wrapper 18 and liner 20 during assembly prior to attachment of thermal bridge 22. Alternatively, as discussed below, vacuum core material 112 may comprise silica powder or other suitable loose filler material that is inserted (e.g. blown) into vacuum cavity 110 after wrapper 18, liner 20, and thermal bridge 22 are assembled. Wrapper 18 may be formed from sheet metal thermoplastic polymer, or other suitable material. The wrapper 18 may be generally bathtub-shaped and may include upper and lower sides 24A and 24B, vertical sides 26A and 26B, and an upright rear side 28. Lower side 24B may include a step-like structure 30 having horizontal and vertical portions 30A and 30B that define an exterior space 32 that is configured to receive the components of refrigeration system 15 (FIG. 1). The vertical sides 26A and 26B may be generally rectangular as shown in FIG. 1 to close off exterior space 32 such that the exterior components of refrigerator system 15 cannot be seen from front and sides of refrigerator 1. Wrapper 18 includes a first opening 34 and a first edge 36 extending around the opening 34. First edge 36 may include upper horizontal portion 36A, lower horizontal portion 36B, and vertical portions 36C and D that extend between upper and lower horizontal portions 36A and 36B, respectively. Thus, in the illustrated example the first opening 34 and first edge 36 are generally quadrilateral. However, it will be understood that the wrapper 18 may have a variety shapes as may be required for a particular application. Wrapper 18 may be made from sheet metal, polymer, or other suitable materials.

If wrapper 18 is made from sheet metal, the wrapper 18 may be formed utilizing known steel forming tools and processes (not shown). Alternatively, wrapper 18 may be formed from a polymer material. For example, wrapper 18 may be fabricated by thermoforming a sheet of thermoplastic polymer material. The wrapper 18 may be constructed of a material that is substantially impervious, such that oxygen, nitrogen, carbon dioxide, water vapor, and/or other atmospheric gasses are sealed out of vacuum cavity 110 that is formed between wrapper 18 and liner 20 as discussed in more detail below. As discussed in more detail below, if wrapper 18 is formed from a polymer material, the polymer material may comprise a plurality of layers, wherein the layers of material are selected to provide impermeability to gasses.

The liner 20 is preferably made from a polymer material in the form of a sheet that is thermoformed. The polymer material may comprise one or more layers of material that are selected to provide impermeability to gasses. The liner 20 includes upper and lower sides 38A and 38B, upright sides 40A and 40B, and an upright rear side 42. Liner 20 includes a step 44 with horizontal and vertical portions 44A and 44B. Step 44 of liner 20 is configured to fit around step 30 of wrapper 18. Liner 20 may optionally include a plurality of reinforcing structures such as ridges 46. Ridges 46 may provide for mounting of shelves or the like (not shown) in the refrigerator 1.

Examples of layered polymer materials that may be utilized to construct wrapper 18 and/or liner 20 are disclosed in U.S. patent application Ser. No. 14/980,702, entitled "MULTILAYER BARRIER MATERIALS WITH PVD OR PLASMA COATING FOR VACUUM INSULATED STRUCTURE," filed on Dec. 28, 2015, now U.S. Pat. No. 10,610,985, and U.S. patent application Ser. No. 14/980,778, entitled "MULTI-LAYER GAS BARRIER MATERIALS FOR VACUUM INSULATED STRUCTURE," filed on Dec. 28, 2015, now U.S. Pat. No. 10,018,406, the entire contents of which are incorporated by reference. Specifically, the wrapper 18 and/or liner 20 may be thermoformed from a tri-layer sheet of polymer material comprising first and second outer structure layers and a central barrier layer that is disposed between the outer layers. The outer layers and the barrier layer may comprise thermoplastic polymers. The barrier layer may optionally comprise an elastomeric material. The outer layers and the barrier layer may be coextruded or laminated together to form a single multilayer sheet prior to thermoforming. The outer structural layers may comprise a suitable thermoplastic polymer material such as High Impact Polystyrene (HIPS) or Acrylonitrile, Butadiene and Styrene (ABS), Polypropylene or Poly Butylene Teraphthalate or Polyethylene. The barrier layer may comprise a thermoplastic polymer material that is impervious to one or more gasses such as nitrogen, oxygen, water vapor, carbon dioxide, etc. such that the wrapper and/or liner 18 and 20, respectively provide a barrier to permit forming a vacuum in vacuum cavity 110. The barrier layer preferably comprises a material that blocks both oxygen and water vapor simultaneously. Examples include Polyvinylidene Chloride (PVdC), high barrier nylon, or liquid crystal polymer. The thickness of the barrier layer may be adjusted as required for different applications to meet varied requirements with respect to oxygen and water vapor transmission rates. The materials are selected to have very good thermoforming properties to permit deep draw ratio thermoforming of components such as wrapper 18 and liner 20 and other vacuum insulated refrigerator structures. Typically, the outer layers have a thickness of about 0.1 mm to 10 mm, and the barrier layer(s) have a thickness of about 0.1 mm to 10 mm.

The following are examples of material combinations that may be utilized to form a tri-layer sheet of material that may be thermoformed to fabricate wrapper 18 and/or liner 20:

Example 1: HIPS/PVdC/HIPS

Example 2: HIPS/Nylon/HIPS

Example 3: HIPS/MXD-6 Nylon/HIPS

Example 4: HIPS/MXD-6 Nylon with Clay Filler/HIPS

Example 5: HIPS/Liquid Crystal Polymer/HIPS

A quad-layer sheet having first and second outer layers and two barrier layers may also be utilized to form wrapper 18, and/or liner 20 The outer layers may comprise HIPS, ABS, or other suitable polymer material (e.g. Polypropylene or Poly Butylene Teraphthalate or Polyethylene) that is capable of being thermoformed. The first barrier layer may comprise a thermoplastic polymer material that is substantially impervious to water vapor. Examples of thermoplastic polymer or elastomeric materials for the first barrier layer include fluoropolymer such as Tetrafluoroethylene (THV), polychlorotrifluoroethylene (PCTFE), Cyclic Olefin Copolymer (COC), Cyclic Olefin Polymer (COP) or high density polyethylene (HDPE). The second barrier layer may comprise a thermoplastic polymer that is substantially impervious to oxygen. Examples of thermoplastic polymer materials include ethylene vinyl alcohol EVOH. An optional tying layer comprising a thermoplastic polymer material may be disposed between the two barrier layers. The optional tie layer may be utilized to bond the two barrier layers to one another. Examples of suitable materials for the tie layer include adhesive resins, such as modified polyolefin with functional groups that are capable of bonding to a variety of polymers and metals.

The following are examples of material combinations that may be utilized to form a quad-layer sheet:

Example 1: HIPS/EVOH/HDPE/HIPS

Example 2: HIPS/EVOH/COP/HIPS

Example 3: HIPS/EVOH/COC/HIPS

Example 4: HIPS/EVOH/THV/HIPS THV

Example 5: HIPS/EVOH/PCTFE/HIPS

The four layers may be coextruded or laminated together to form a single sheet of material prior to thermoforming to fabricate wrapper 18 and/or liner 20.

Figure 6:
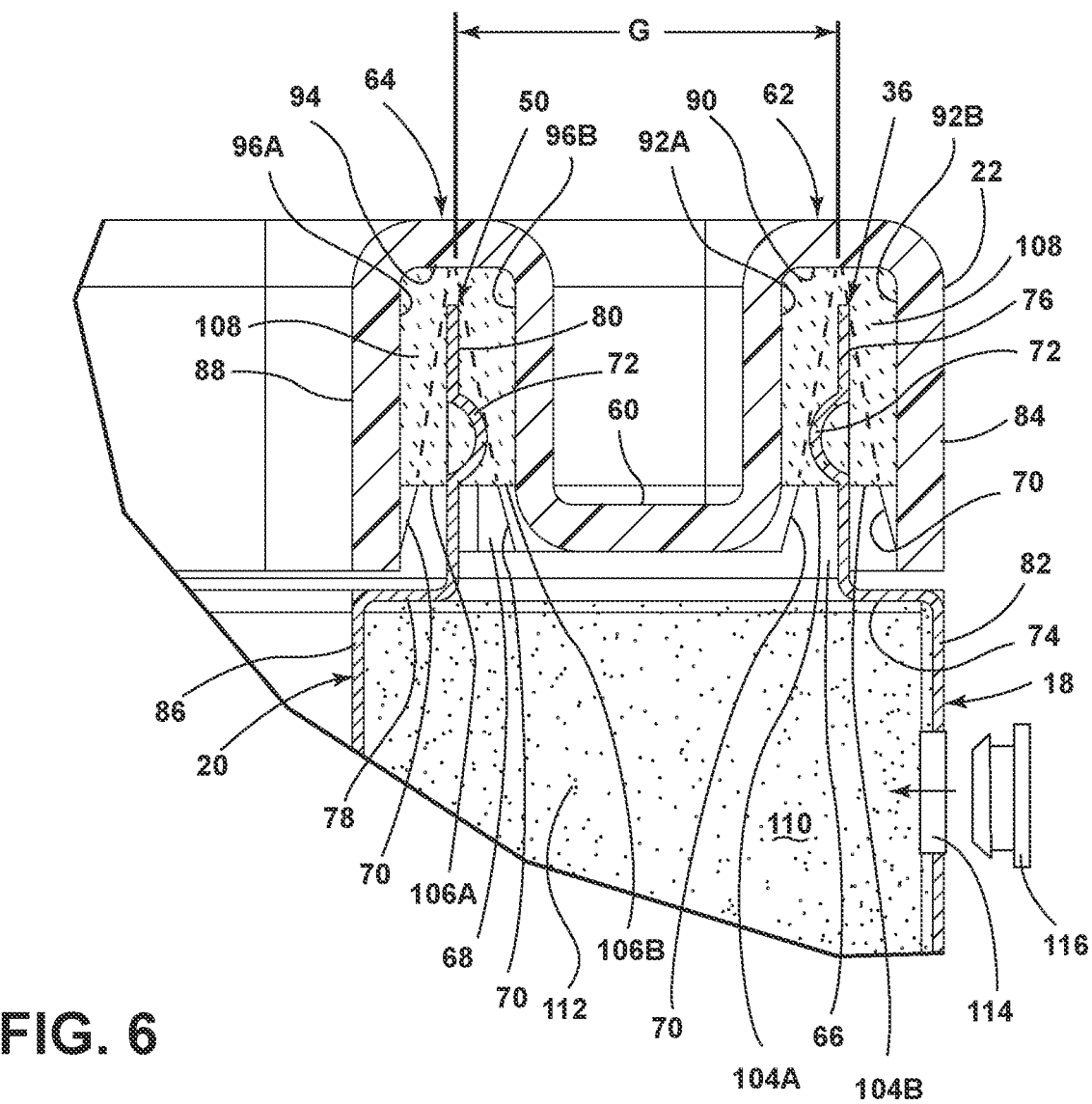
FIG. 6 is a partially fragmentary cross sectional view of the vacuum insulated refrigerator cabinet structure of FIG. 4 taken along the line VI-VI.

Liner 20 includes a second opening 48 and a second edge 50. The second edge 50 may include linear portions 50A-50D such that second opening 48 is generally quadrilateral. The liner 20 is preferably somewhat smaller than wrapper 18 to thereby form vacuum cavity 110 (FIG. 6) between liner 20 and wrapper 18 when liner 20 is positioned inside wrapper 18. Also, edges 36 and 50 are spaced apart to form a gap "G" (FIG. 6).

The vacuum insulated cabinet structure 2 also includes a thermal bridge 22. When cabinet structure 2 is assembled, thermal bridge 22 connects to the first edge 36 of wrapper 18 and to second edge 50 of liner 20 to thereby interconnect the wrapper 18 and liner 20 and to close off the gap "G" formed between first edge 36 and second edge 50 when wrapper 18 is positioned inside liner 20. Thermal bridge 22 is preferably formed from a suitable material (e.g. a polymer such as Nylon, Poly Vinyl Chloride (PVC), or Polybutylene Terephthalate (PBT)) that is substantially impervious to gasses to maintain a vacuum in vacuum cavity 110, and also having a low coefficient of thermal conductivity to reduce or prevent transfer of heat between wrapper 18 and liner 20. Thermal bridge 22 may be formed utilizing molding processes, and may include a plurality of layers of material to provide the necessary impermeability. For example, thermal bridge 22 could comprise the same layers as the wrapper 18 and liner 20 discussed above. Thermal bridge 22 is preferably configured to have a maximum allowable oxygen permeation of 10 cc/m$^2$ per day, a maximum allowable water vapor permeation of 10 g/m$^2$ per day. These maximum allowable rates are generally at one atmosphere, and at room temperature. It will be understood that lower permeation rates are preferred, and the rates discussed above are preferred maximum rates. However, materials providing rates higher than these preferred maximums could also be utilized. Also, the material of thermal bridge 22 preferably has a coefficient of thermal expansion that is $4.0 \times 10^{-5}$ or lower, can withstand at least 6% strain (more preferably 35% or higher) and at least 1.0 MPa stress (more preferably 7.0 PMa or higher). It will be understood that thermal bridge 22 could be made from materials having properties above or below the specific preferable numerical values discussed above. When refrigerator 1 (FIG. 1) is in use, wrapper 18 is typically exposed to room temperature air, whereas liner 20 is generally exposed to refrigerated air in refrigerator compartment 10 or freezer compartment 12. Because thermal bridge 22 is made of a material that is substantially non-conductive with respect to heat, the thermal bridge 22 reduces transfer of heat from wrapper 18 to liner 20.

Thermal bridge 22 may include four linear portions 22A-22D that are interconnected to form a ring-like structure having a quadrilateral perimeter 52 and a quadrilateral inner edge or surface 54 that defines a quadrilateral opening 56. The opening 56 generally corresponds to the opening 4 (FIG. 1) of cabinet structure 2. It will be understood that the thermal bridge 22 may have various shapes and configurations as may be required for a particular application.

Figure 3:
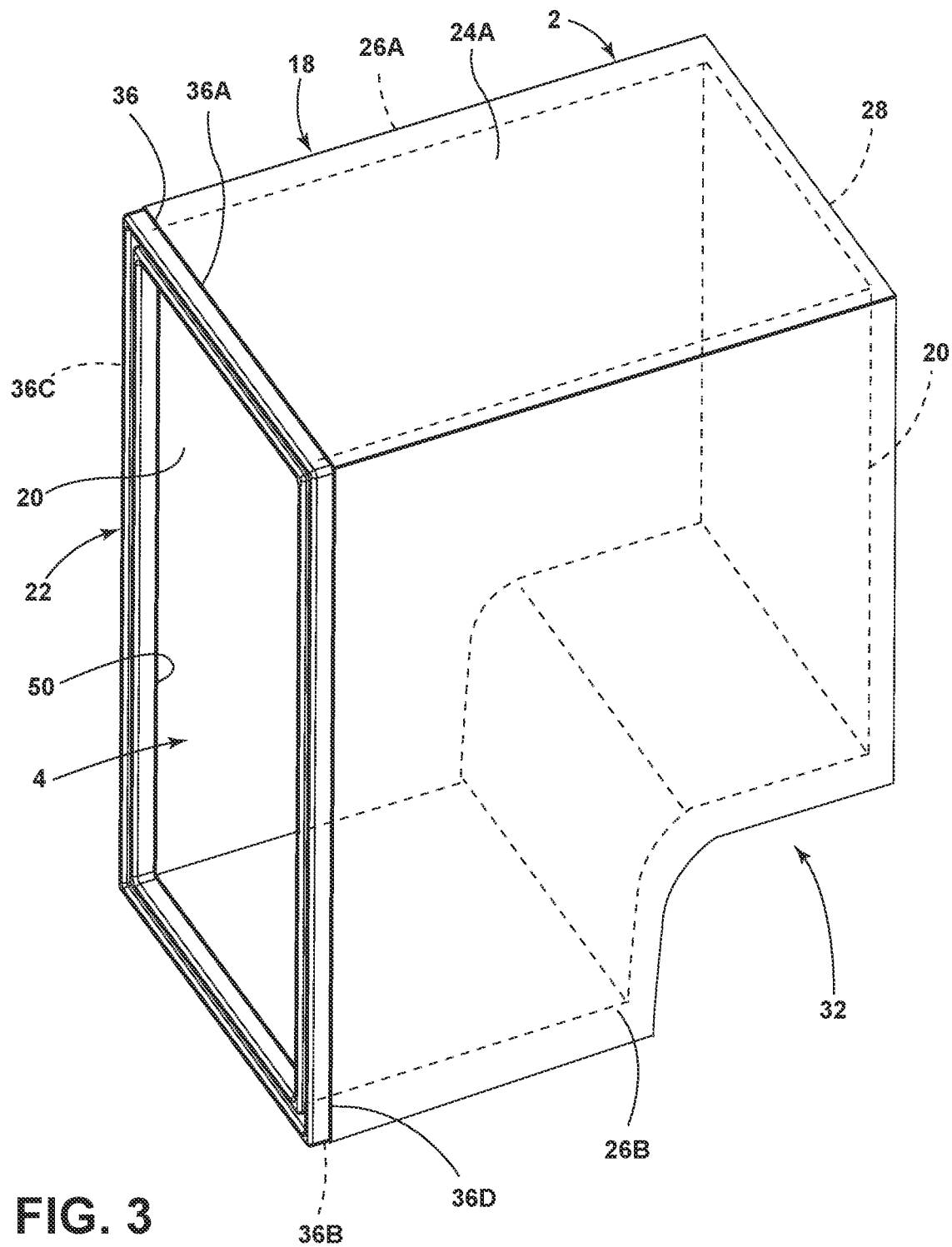
FIG. 3 is an isometric view of a vacuum insulated refrigerator cabinet structure.
Figure 4:
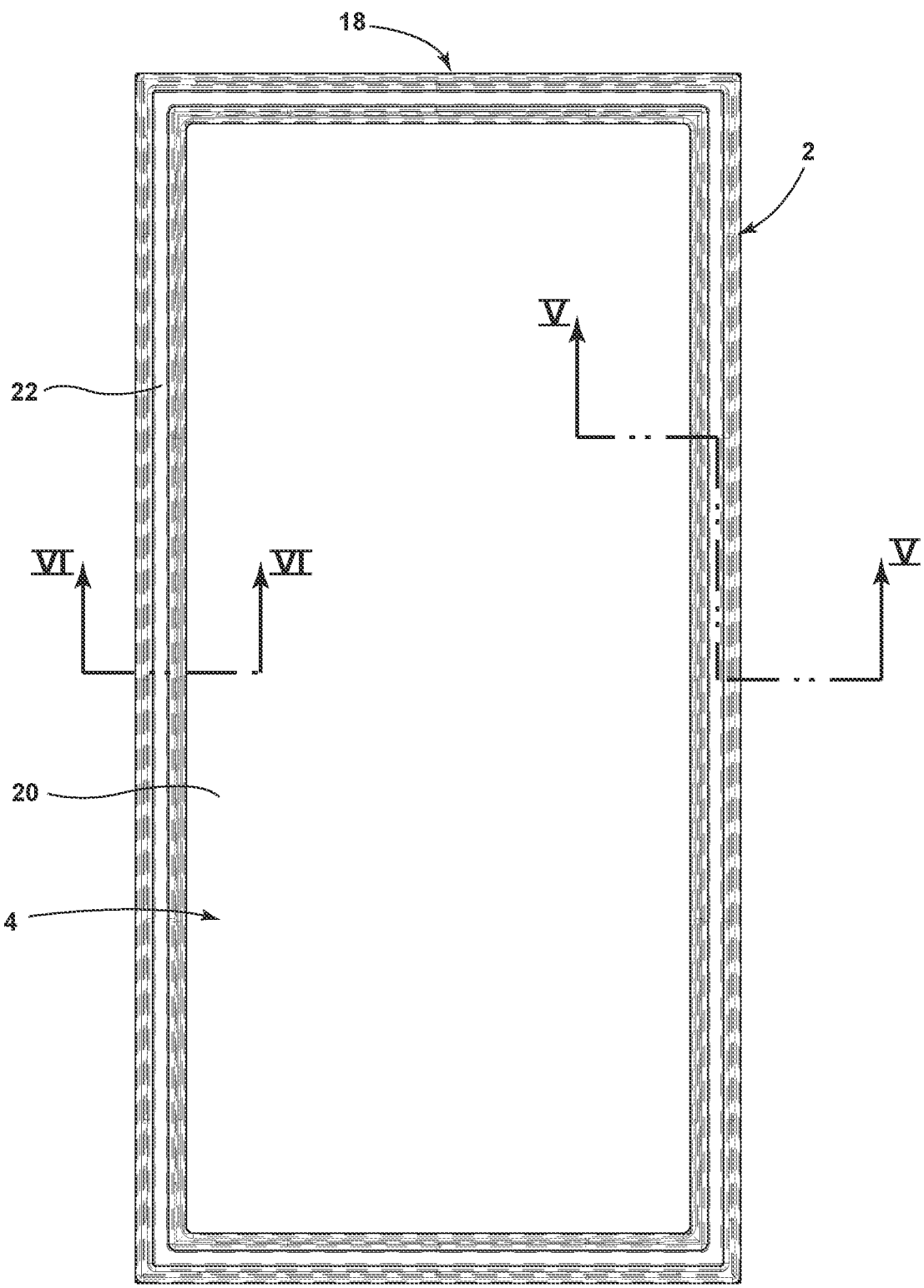
FIG. 4 is a front elevational view of the vacuum insulated refrigerator structure of FIG. 3.

With further reference to FIGS. 3 and 4, when vacuum insulated cabinet structure 2 is assembled, the liner 20 is positioned inside wrapper 18, and thermal bridge 22 is connected to the first edge 36 of wrapper 18 and to the second edge of liner 20.

Figure 5:
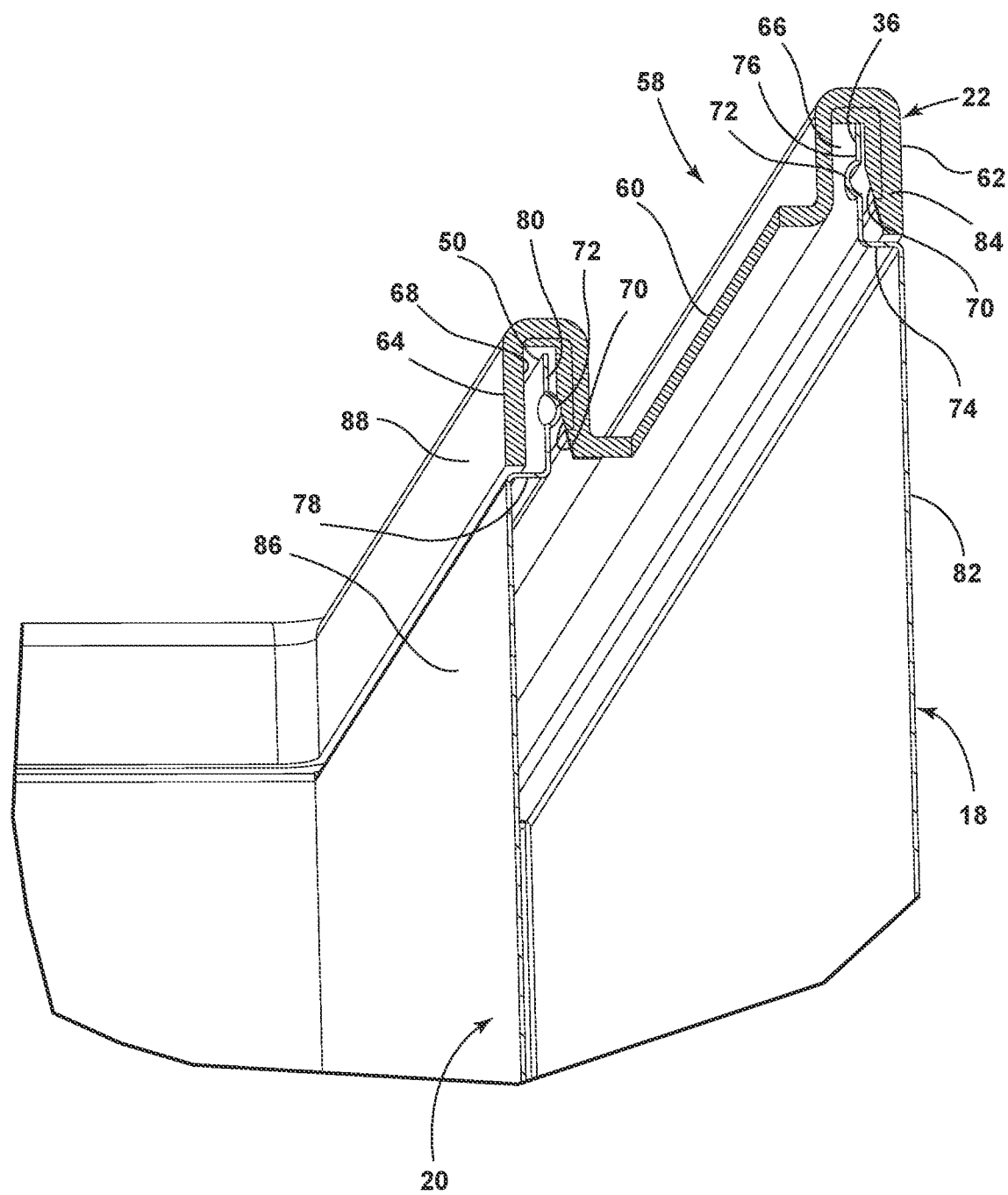
FIG. 5 is a partially fragmentary isometric cross sectional view of the vacuum insulated refrigerator cabinet structure of FIG. 4 taken along the line V-V.

With reference to FIGS. 5 and 6, a central portion 58 of thermal bridge 22 includes a central wall or web 60 and U-shaped first and second end portions 62 and 64, respectively. The materials arranged in end portions 62 and 64 are generally U-shaped to form first and second channels 66 and 68, respectively. The first edge 36 of wrapper 18 may include a transverse wall or flange 74, FIG. 6, and an end flange portion 76 that is received in first channel 66. The transverse portion 74 permits the outer surface 82 of wrapper 18 to be flush with outer surface 84 of thermal bridge 22. Similarly, second edge 50 of liner 20 may include a transverse portion 78 and an end flange or portion 80 that is received in second channel 68. The offset 78 permits outer surface 86 of liner 20 to be flush with outer surface 88 of thermal bridge 22. The end flanges 76 and 80 may optionally include raised portions 72. The raised portions 72 may comprise dome-like dimples, ridges, or the like.

Referring to FIG. 6, first channel 66 is generally U-shaped, and includes a base surface 90 and inwardly-facing opposite side surfaces 92A and 92B that extend transversely away from base surface 90. Similarly, second channel 68 includes a base surface 94 and first and second inwardly-facing opposite side surfaces 96A and 96B that extend transversely away from base surface 94. A plurality of tapered bosses 70 extend inwardly from the side surfaces 92A and 92B of first channel 66, and from side surfaces 96A and 96B of second channel 68.

Figure 7:
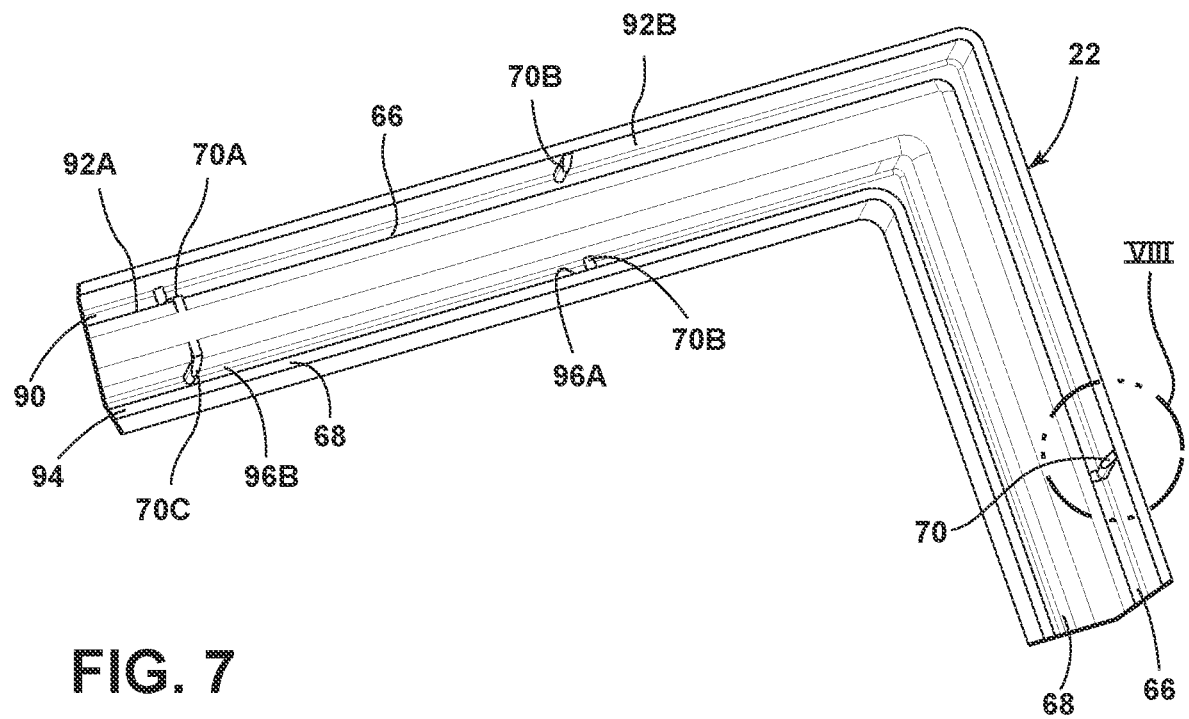
FIG. 7 is a fragmentary isometric view of a portion of an insulating thermal bridge.
Figure 8:
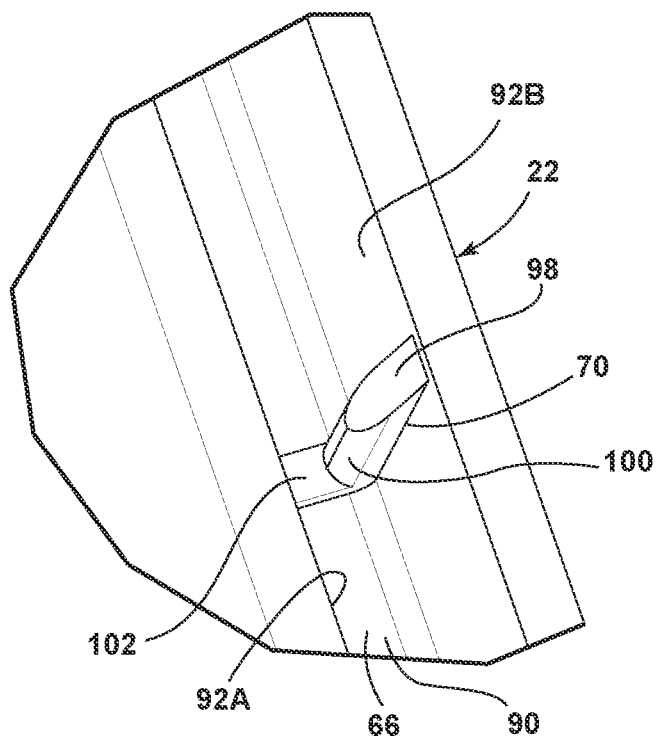
FIG. 8 is a fragmentary enlarged view of a portion of the insulating thermal bridge of FIG. 7.

As shown in FIGS. 7 and 8, the bosses 70 may be staggered or offset. For example, as shown in FIG. 7, a first boss 70A may extend into channel 66 from side surface 92A of channel 66, and a second boss 70B may extend into channel 66 from second side surface 92B. The bosses 70A and 70B are preferably spaced-apart such that a pair of bosses are not positioned directly across from one another on the opposite sidewalls 92A and 92B of first channel 66. Similarly, as also shown in FIG. 7, second channel 68 may include a boss 70B that extends inwardly from side surface 96B of channel 68, and a second boss 70C that extends into channel 68 from side surface 96B. Thus, the bosses 70B and 70C of second channel 68 are also spaced-apart or staggered, such that a pair of the bosses do not extend into second channel 68 directly across from one another.

As shown in FIG. 8, bosses 70 may include a main portion 100 having a generally cylindrical outer surface, and a tapered end/ramp portion 98. The bosses 70 may optionally include a raised ridge 102 that extends across base surface 90 of first channel 66 and/or base surface 94 of second channel 68.

During assembly, liner 20 is inserted into wrapper 18, and thermal bridge 22 is positioned on the first and second edges 36 and 50 of wrapper 18 and liner 20, respectively. As the thermal bridge 22 is attached, the first and second edges 36 and 50 slide into first and second channels 66 and 68, respectively. The tapered bosses 70 ensure that the edges 36 and 50 are positioned away from the side surfaces 90A and 90B of first channel 66 and side surfaces 96A and 96B of second channel 68. If the edges 36 and 50 include dimples 72, the dimples 72 also ensure that the first and second edges 36 and 50 of wrapper 18 and liner 20, respectively, are not positioned directly against the side surfaces 92A, 92B and 96A, 96B in regions between bosses 70. The tapered bosses 70 ensure that gaps 104A and 104B (FIG. 6) are formed between first edge 36 of wrapper 18 and side surfaces 92A and 92B of first channel 66 (FIG. 6). Tapered bosses 70 also ensure that gaps 106A and 106B are formed between second edge 50 and side surfaces 96A and 96B of second channel 68. Optional bases 102 (FIG. 8) may be utilized to ensure that edges 36 and 50 do not abut the bases 90 and 94 of channels 66 and 68, respectively.

After the first and second edges 36 and 50, respectively, are positioned in first and second channels 66 and 68, respectively, curable sealant 108 is poured or injected into first channel 66 and second channel 68 to fill the gaps 104A, 104B and 106A, 106B. End flanges 76 and 80 of first and second edges 36 and 50, respectively, are substantially encapsulated by the curable sealant 108. The curable sealant 108 is allowed to cure to thereby seal the vacuum cavity 110 formed between wrapper 18 and liner 20. As shown in FIG. 6, the thermal bridge 22 generally extends across the gap "G" formed between the first and second edges 36 and 50 of wrapper 18 and liner 20, respectively.

After the wrapper 18, liner 20, and thermal bridge 22 are assembled, the resulting subassembly may be positioned in a vacuum chamber (not shown), and porous filler material 112 may be introduced into vacuum cavity 110 through an opening 114. A plurality of openings 114 may be formed in wrapper 18 and/or liner 20 as may be required to provide for introduction of filler material 112. Filler material 112 may comprise a loose powder such as silica powder, or other suitable material. Alternatively, the filler material 112 may comprise preformed vacuum core panels 112A-112G (FIG. 2) that are positioned between wrapper 18 and liner 20 at the time liner 20 is inserted into wrapper 18 (i.e. before thermal bridge 22 is installed). Gaps between vacuum core panels 112A-112G may be filled with polyurethane foam or other suitable material. It will be understood that filler material 112 may comprise virtually any suitable material such as fiberglass, open or closed cell foam, or the like. Suitable plugs 116 or the like are then inserted into the openings 114 and sealed, and the cabinet structure 2 is then removed from the vacuum chamber.

Figure 9:
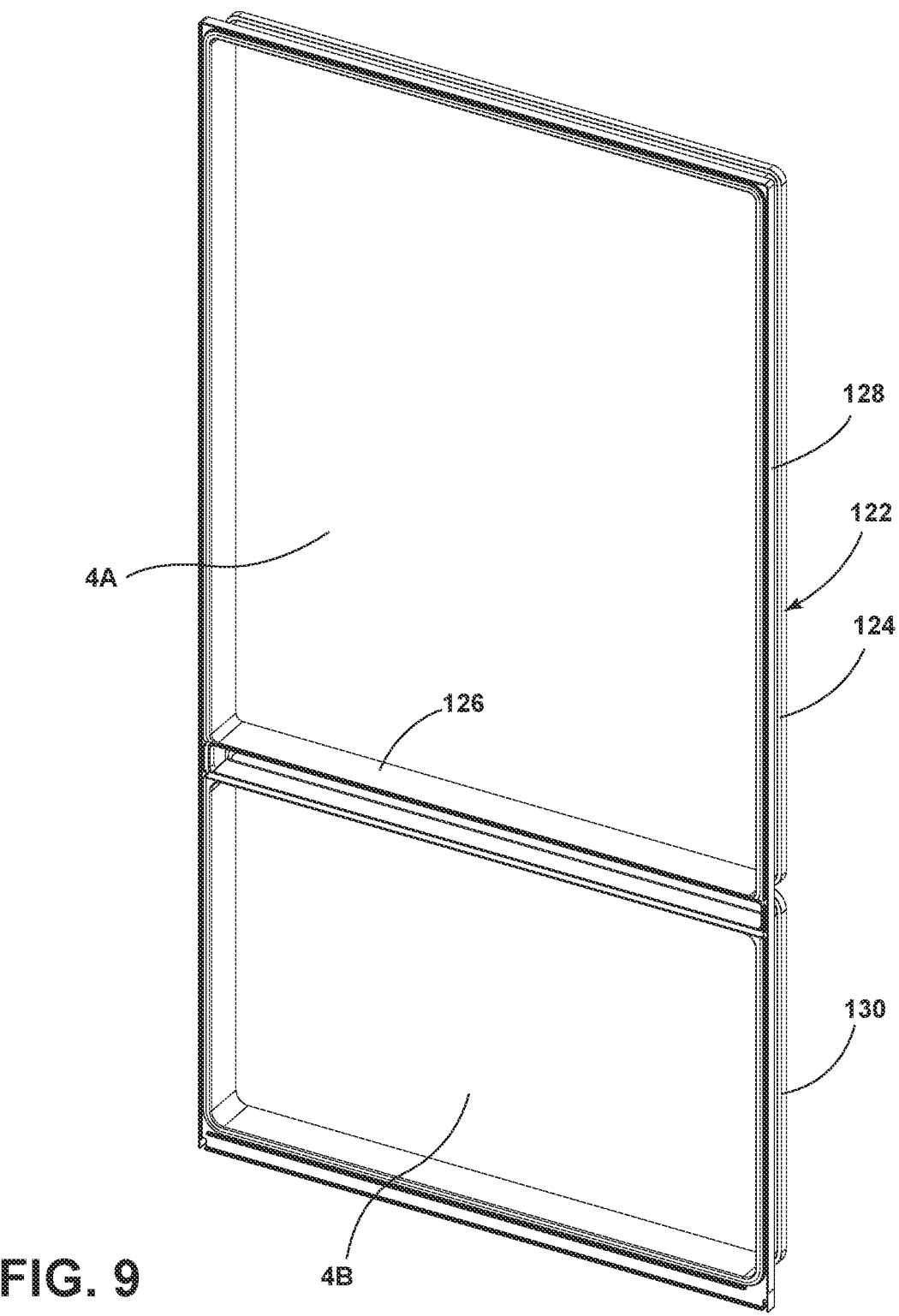
FIG. 9 is an isometric view of another version of the thermal bridge breaker.
Figures 10, 11:
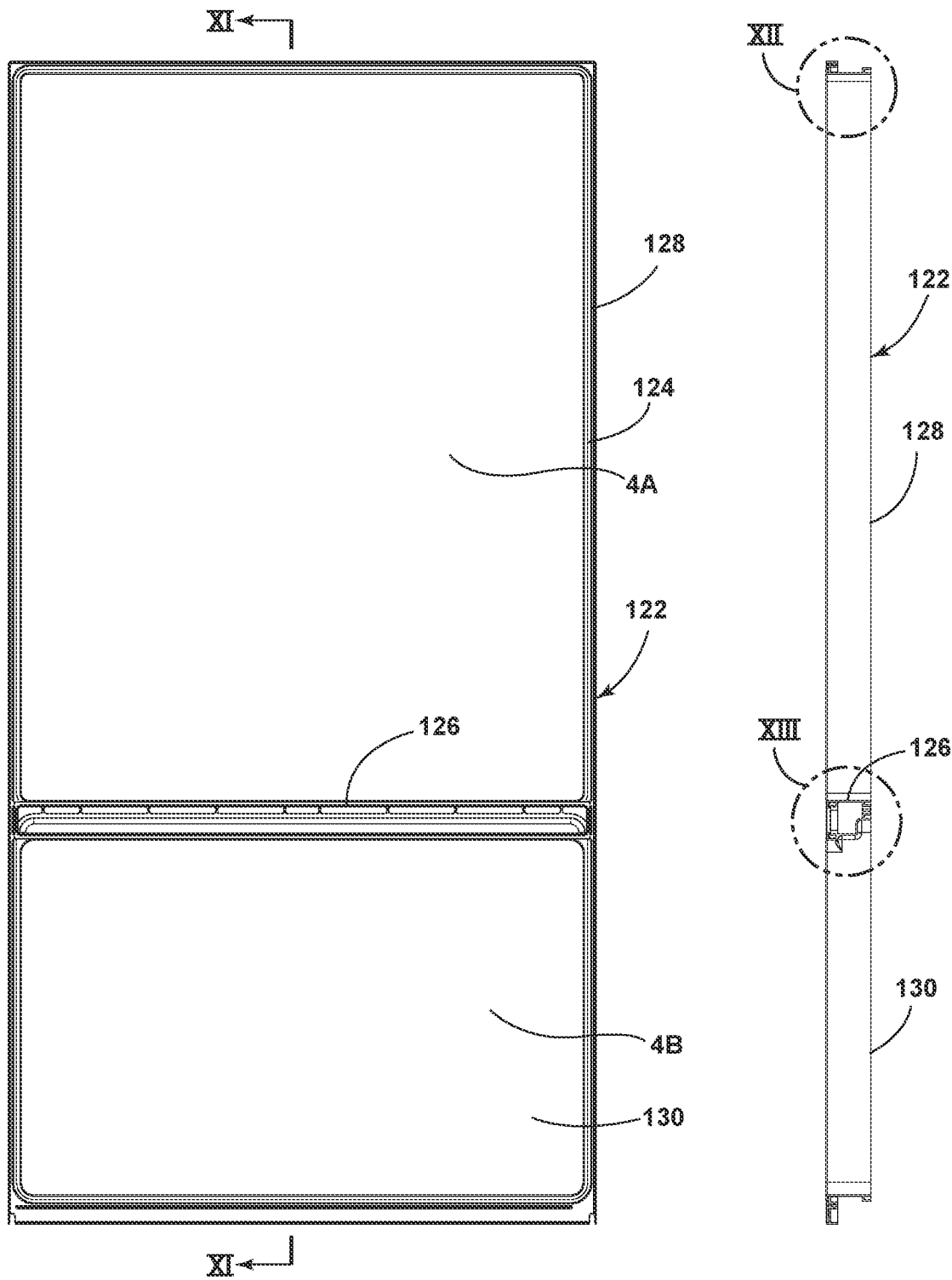
FIG. 10 is a front elevational view of the thermal bridge breaker of FIG. 9.
FIG. 11 is a cross sectional view of the thermal bridge of FIG. 10 taken along the line XI-XI.

With further reference to FIGS. 9-11, a thermal bridge 122 includes a rectangular perimeter 124 and a divider 126 that forms an upper opening 4A and lower opening 4B. The thermal bridge 122 is configured to provide upper and lower openings 4A and 4B that provide access to an upper refrigerated compartment 10 (FIG. 1) and a lower freezer compartment 12. An upper liner 20A attaches to an upper portion 128 of thermal bridge 122 that is above divider 126, and a lower liner 20B attaches to a lower portion 130 of thermal bridge 122 that is below divider 126.

Figure 12:
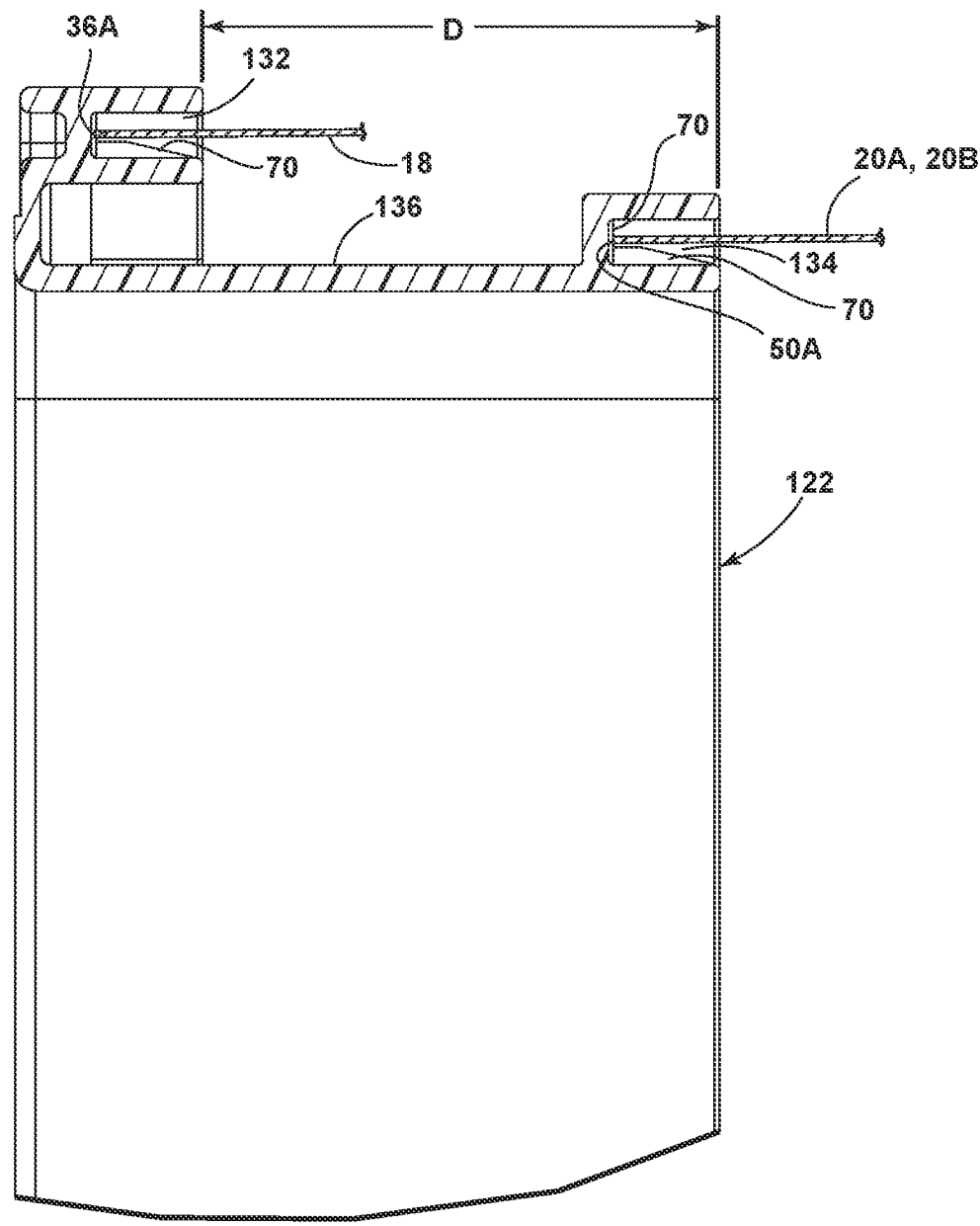
FIG. 12 is a fragmentary enlarged view of a portion of the thermal bridge of FIG. 11.

With further reference to FIG. 12, thermal bridge 122 includes a first channel 132 that receives first edge 36 of wrapper 18, and a second channel 134 that receives second edge 50 of liner 20. The channels 132 and 134 may include a plurality of tapered bosses 70 that position the first and second edges 36 and 50 in the channels 132 and 134 during assembly. The channels 132 and 134 may be filled with sealant 108 in substantially the same manner as described in more detail above in connection with FIGS. 5 and 6. The perimeter 124 of thermal bridge 122 includes a central web or wall 136 that extends in a generally four-aft direction whereby the first and second channels 132 and 134 are offset in a fore-aft direction relative to each other by a distance "D." Thus, the liners 20A and 20B utilized in connection with the thermal bridge 122 have edges 50A that are offset inwardly relative to edges 36A of liner 18.

Figure 13:
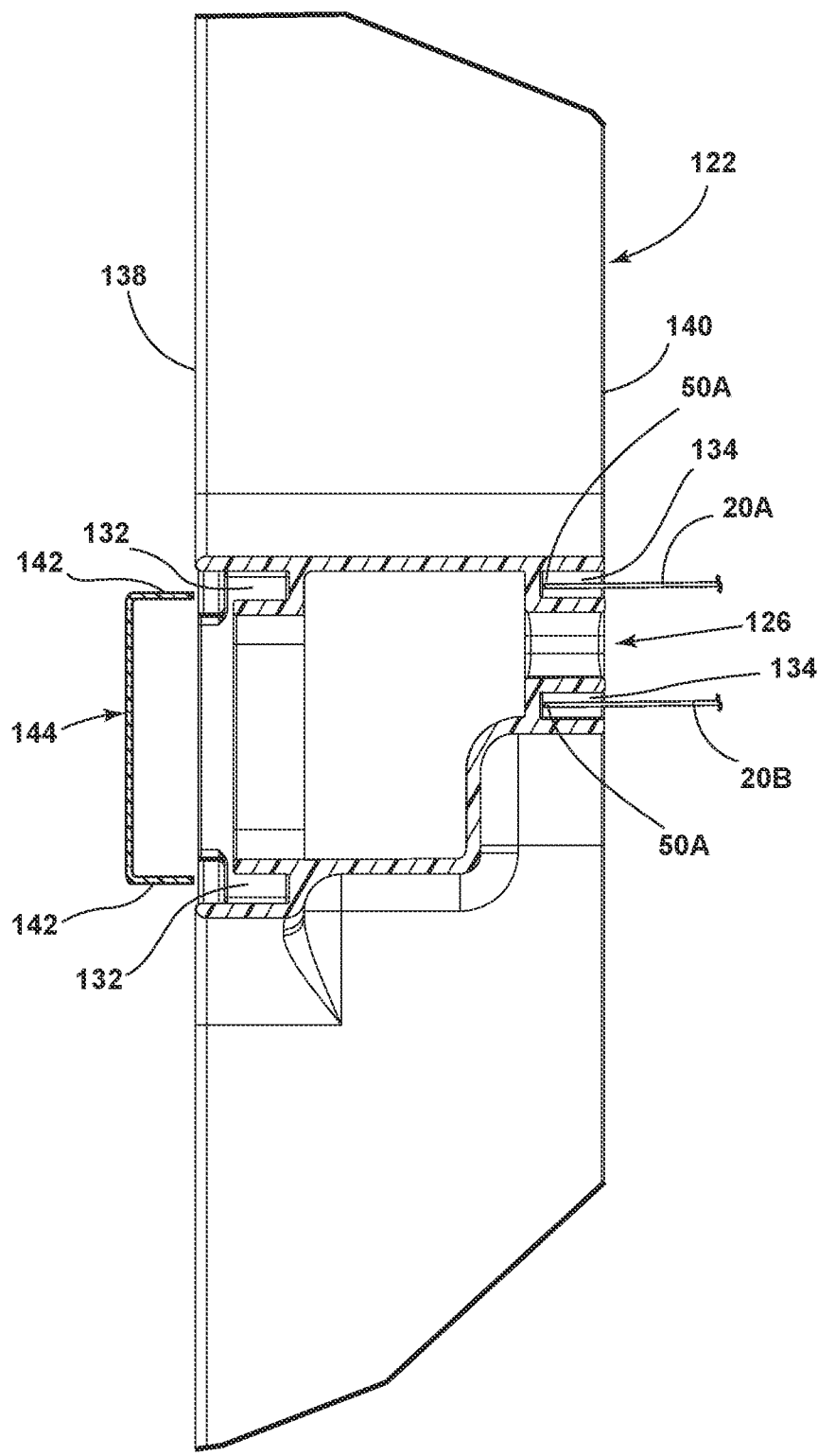
FIG. 13 is a fragmentary enlarged view of a portion of the thermal bridge of FIG. 11.

With further reference to FIG. 13, horizontal divider 126 includes a pair of parallel first channels 132 that extend along a front side 138 of thermal bridge 122, and a pair of parallel channels 134 that extend along a rear side 140 of thermal bridge 122. Edges 50A of upper and lower liners 20A and 20B are received in channels 134, and edges 142 of a cap strip 144 are received in channels 132.

Figure 14:
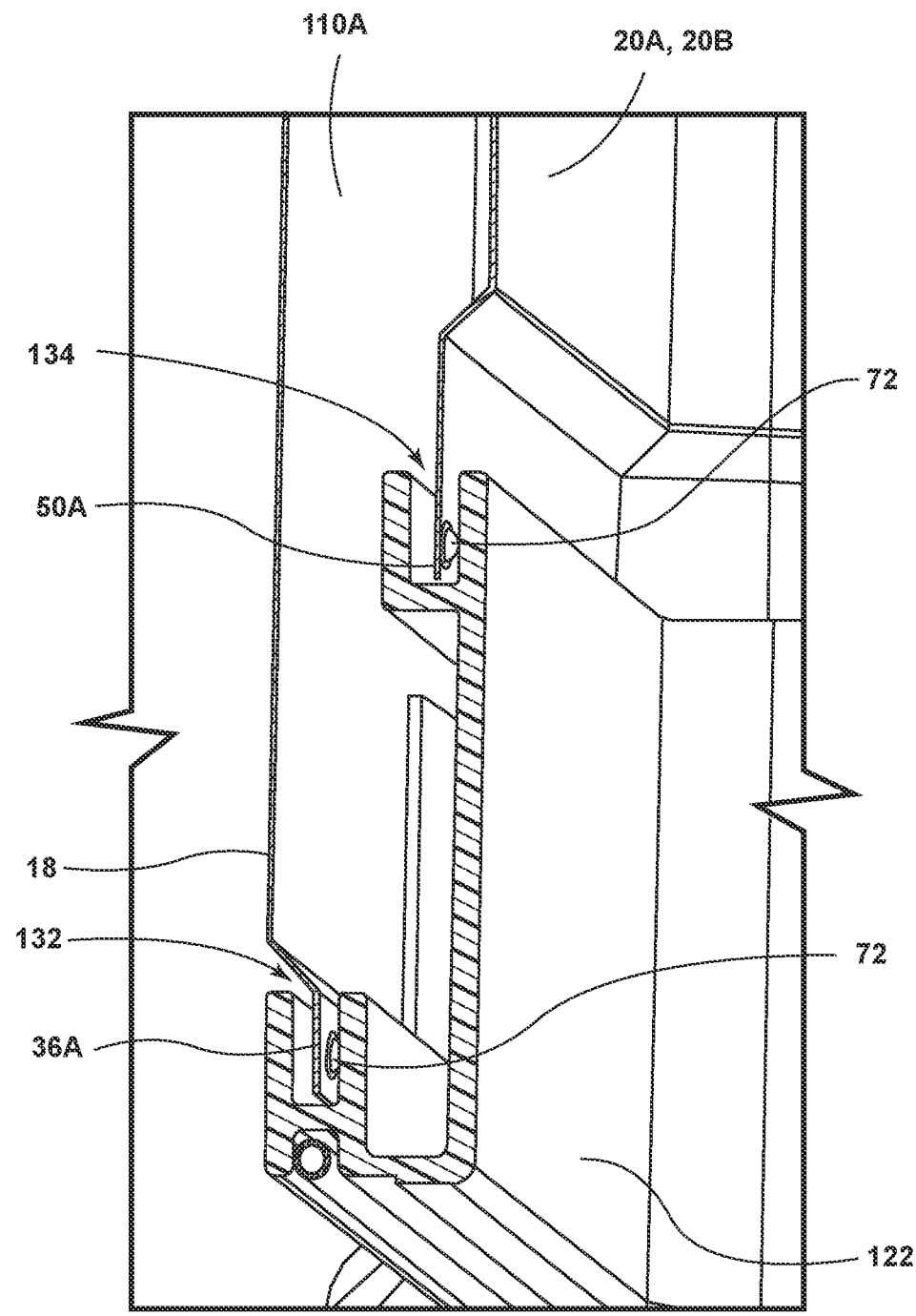
FIG. 14 is a fragmentary isometric view of a portion of the thermal bridge of FIG. 9 when assembled with a wrapper and a liner.

With further reference to FIG. 14, during assembly the liners 20A and 20B are positioned inside wrapper 18, and thermal bridge 122 is connected to the edges 36A and 50A of wrapper 18 and liners 20A and 20B, respectively. As shown in FIG. 14, thermal bridge 122 may have a J-shape in cross section. As noted above, the first and second channels 132 and 134 may include a plurality of tapered bosses 70 that are substantially similar to the bosses of thermal bridge 22. The bosses 70 ensure that the edges 36A and 50A are positioned in central portions of the first and second channels 132 and 134. The edges 36A and 50A may optionally include a plurality of raised dimples 72 that also ensure that the edges 36A and 50A are not positioned directly against a side surface of a channel 132 or 134. The channels 132 and 134 are filled with curable sealant 108, and the cabinet structure is placed in a vacuum chamber. A vacuum cavity 110A formed between wrapper 18 and liners 20A and 20B is then filled with filler material such as filler panels 112A-112G (FIG. 2) or lose filler material 112 as discussed in more detail above in connection with FIG. 6. Thus, filler material 112 may comprise porous, loose filler material such as silica powder that is inserted through an opening 114 while the cabinet structure is in a vacuum chamber. Alternatively, the filler material 112 may comprise preformed core panels 112A-112G that are positioned between the wrapper 18 and liners 20A and 20B during the assembly process (e.g. before thermal bridge 122 is connected to the wrapper 18 and liners 20A and 20B).

It is to be understood that variations and modifications can be made on the aforementioned structures and methods without departing from the concepts of the present device, and further it is to be understood that such concepts are intended to be covered by the following claims unless these claims by their language expressly state otherwise.

What is claimed is:

1. A method of making a vacuum insulated refrigerator structure, the method comprising:
providing at least one sheet of material;
forming a wrapper from the at least one sheet of material whereby the wrapper has a first opening and a first edge extending around the first opening;
forming a liner from the at least one sheet of material whereby the liner has a second opening and a second edge extending around the second opening;
positioning the liner inside the wrapper with the first and second edges being spaced apart to form a first gap therebetween, and to form a cavity between the wrapper and the liner;
positioning a thermal bridge across the first gap, wherein the thermal bridge includes an elongated first channel having a base surface and opposite side surfaces extending transversely from the base surface, the elongated first channel including a plurality of locating structures protruding inwardly from the opposite side surfaces;
inserting a selected one of the first and second edges into the first channel;
causing the selected one of the first and second edges to contact at least one locating structure as the selected one of the first and second edges is inserted into the first channel to form edge gaps on opposite sides of the selected one of the first and second edges and the opposite side surfaces of the first channel;
positioning curable sealant in the first channel in the edge gaps on opposite sides of the selected one of the first and second edges;
curing the curable sealant to form an airtight seal;
causing porous material to at least partially fill the cavity between the wrapper and the liner;
forming a vacuum in the cavity; and
sealing the cavity to maintain the vacuum.

2. The method of claim 1, wherein:
the thermal bridge further includes a second channel including a locating structure; and including:
inserting the first edge into the first channel;
inserting the second edge into the second channel; and
positioning curable sealant in the first and second channels after positioning the thermal bridge across the first gap.

3. The method of claim 2, wherein:
the locating structures in the first and second channels comprise tapered bosses.

4. The method of claim 1, wherein:
the thermal bridge comprises a polymer material that is substantially impervious to gasses.

5. The method of claim 4, wherein:
the thermal bridge has an oxygen permeation of no more than 10 cc/m$^2$ per day, and a water vapor permeation of no more than 10 g/m$^2$ per day.

6. The method of claim 4, wherein:
the thermal bridge comprises polymer material having a coefficient of thermal expansion of no more than $4.0 \times 10^{-5}$.

7. The method of claim 1, wherein:
the locating structures include tapered surfaces that are configured to guide the selected one of the first and second edges towards a center of the first channel; and including:
causing the selected one of the first and second edges to engage the locating structures as the selected one of the first and second edges is inserted into the first channel, wherein the selected one of the first and second edges is centered in the first channel when fully inserted in the first channel.

8. The method of claim 1, wherein:
the at least one of the plurality of locating structures comprises a tapered boss.

9. The method of claim 1, wherein:
the locating structures are staggered whereby locating structures are not positioned directly across from one another on the side surfaces.

10. The method of claim 1, wherein:
the first gap is ring-shaped;
the thermal bridge is ring-shaped and including:
positioning curable sealant in the first channel before the ring-shaped thermal bridge is positioned across the ring-shaped first gap.

11. The method of claim 1, wherein:
providing at least one sheet of material includes providing a sheet of thermoplastic polymer material and a metal sheet; and including:
thermoforming the liner from the sheet of thermoplastic polymer material;
forming the wrapper from the metal sheet; and
molding the thermal bridge from a polymeric material.

12. The method of claim 1, including:
positioning the opening of the liner to face in a forward direction;
positioning linear portions of the first and second edges at substantially the same fore-aft position; and
at least a portion of the thermal bridge has a U-shape in cross section, and further includes a second channel, the first and second channels extending along opposite ends of the U-shape.

13. The method of claim 1, including:
offsetting at least a portion of the second edge inwardly relative to the first edge; and wherein:
at least a portion of the thermal bridge has a J-shape in cross section; and
the thermal bridge further includes a second channel, the first and second channels extending along opposite ends of the J-shape.

14. The method of claim 1, wherein:
the porous material comprises at least one core panel; and including:
positioning the core panel in the cavity before the thermal bridge is positioned across the first gap.

15. The method of claim 1, wherein:
the porous material comprises powder; and including:
introducing the porous powder material into the cavity after the thermal bridge is positioned across the first gap.

16. A method of making a vacuum insulated refrigerator structure, the method comprising:
forming a wrapper having a first opening and a first edge extending around the first opening;
forming a liner having a second opening and a second edge extending around the second opening;
positioning the liner inside the wrapper with the first and second edges being spaced apart to form a gap therebetween, and to form a cavity between the wrapper and the liner;
positioning a thermal bridge across the gap, wherein the theiiiial bridge includes elongated first and second channels, wherein at least one of the first and second channels includes a base surface and spaced-apart side surfaces extending transversely from the base surface, and wherein at least one of the side surfaces includes a plurality of locating structures protruding into the channel, and wherein at least one of the first and second channels includes a plurality of locating structures protruding into the channel from both side surfaces;
inserting the first and second edges into the first and second channels, respectively;
positioning curable sealant in the first and second channels;
curing the curable sealant in the first and second channels to fotin airtight seals along the first and second edges;
causing porous material to at least partially fill the cavity between the wrapper and the liner;
forming a vacuum in the cavity;
sealing the cavity to maintain the vacuum;
and including:
causing at least one of the first and second edges to contact at least one locating structure as the first and second edges are inserted into the first and second channels, respectively.

17. The method of claim 16, wherein:
the gap is ring-shaped;
at least selected ones of the plurality of locating structures protruding into the channel from both side surfaces are tapered such that the first and second edges of the wrapper and the liner, respectively, slidably engage the selected ones of the plurality of locating structures protruding into the channel from both side surfaces as the thermal bridge is positioned across the ring-shaped gap.

18. A vacuum insulated refrigerator structure, comprising:
an outer wrapper formed from at least one sheet of material and having a first opening and a first edge extending around the first opening;
a liner formed from the at least one sheet of material and having a second opening and a second edge extending around the second opening, wherein the liner is disposed inside the wrapper with the first and second edges being spaced apart to form a first gap therebetween and to form a vacuum cavity between the wrapper and the liner;
a thermal bridge extending across the first gap, wherein the thermal bridge includes an elongated first channel, the elongated first channel including a base surface and opposite side surfaces extending transversely from the base surface, and wherein the elongated first channel includes a plurality of locating structures protruding inwardly from the opposite side surfaces, and wherein at least a selected one of the first and second edges is disposed in the first channel, and wherein at least one of the locating structures positions the selected one of the first and second edges to form edge gaps on opposite sides of the selected one of the first and second edges and the opposite side surfaces of the first channel;
cured sealant disposed in the first channel, including the edge gaps on opposite sides of the selected one of the first and second edges, wherein the cured sealant foams an airtight seal;
wherein the vacuum cavity is sealed to maintain a vacuum in the vacuum cavity; and
porous material at least partially filling the vacuum cavity between the wrapper and the liner.

19. The vacuum insulated refrigerator structure of claim 18, wherein:
the thermal bridge further includes a second channel including a base surface and opposite side surfaces extending transversely from the base surface, and further having a second plurality of locating structures protruding from the opposite surfaces thereof.

20. The vacuum insulated refrigerator structure of claim 18, wherein:
the first and second edges are encapsulated by the sealant.

* * * * *